(12) United States Patent
Steigert et al.

(10) Patent No.: US 11,795,851 B2
(45) Date of Patent: Oct. 24, 2023

(54) ELECTRICAL HEATING UNIT

(71) Applicant: HJS Emission Technology GMBH & CO. KG, Menden (DE)

(72) Inventors: Simon Steigert, Menden (DE); Jochen Koll, Arnsberg (DE); Frank Röse, Menden (DE)

(73) Assignee: HJS EMISSION TECHNOLOGY GMBH & CO. KG, Menden (DE)

( * ) Notice: Subject to any disclaimer, the term of this patent is extended or adjusted under 35 U.S.C. 154(b) by 0 days.

(21) Appl. No.: 17/783,084

(22) PCT Filed: Aug. 20, 2021

(86) PCT No.: PCT/EP2021/073132
§ 371 (c)(1),
(2) Date: Jun. 7, 2022

(87) PCT Pub. No.: WO2022/043207
PCT Pub. Date: Mar. 3, 2022

(65) Prior Publication Data
US 2023/0129655 A1    Apr. 27, 2023

(30) Foreign Application Priority Data

Aug. 28, 2020   (DE) .................... 20 2020 104 976.3
Mar. 1, 2021    (DE) .................... 20 2021 100 999.3

(51) Int. Cl.
*F01N 3/20*      (2006.01)
*H05B 3/32*      (2006.01)
(Continued)

(52) U.S. Cl.
CPC ............ *F01N 3/2026* (2013.01); *H05B 3/32* (2013.01); *F01N 3/027* (2013.01); *F01N 3/2066* (2013.01);
(Continued)

(58) Field of Classification Search
CPC ...... F01N 3/2026; F01N 3/027; F01N 3/2066; F01N 3/00; F01N 3/2006; F01N 3/021;
(Continued)

(56) References Cited

U.S. PATENT DOCUMENTS 4,787,349 A * 11/1988 Hilger ................. F02B 23/0657
                                                    123/297
5,053,603 A * 10/1991 Wagner .................... H05B 3/76
                                                    219/205

(Continued)

FOREIGN PATENT DOCUMENTS

| CN | 113464249 A | * | 10/2021 | .......... F01N 13/1811 |
| DE | 102020122559 B3 | | 8/2021 | |

(Continued)

OTHER PUBLICATIONS

Examination report dated Mar. 26, 2021 in related German application No. 10 2020 122 559.8.

(Continued)

*Primary Examiner* — Shawntina T Fuqua
(74) *Attorney, Agent, or Firm* — POLSON INTELLECTUAL PROPERTY LAW, PC; Margaret Polson; Christopher Sylvain

(57) ABSTRACT

An electrical heating unit H for introduction into the exhaust gas system of an internal combustion engine, in particular upstream with respect to an exhaust gas purification unit, for instance a catalytic converter, which for its operation requires a temperature higher than the ambient temperature, comprises a casing (13) and at least one resistance heating element (14) which is designed as a band and is retained inside the casing (13), wherein the at least one heating band (14) is arranged so that it runs in a meandering pattern and with its flat face parallel or substantially parallel to the longitudinal axis of the casing (13). The heating unit H also comprises at least one support structure (19, 19.1) which is (Continued)

arranged on the end face relative to the heating band (14) and mechanically connected to the casing (13) and has slot-shaped heating band bearings (27) to retain the heating band (14) inside the casing (13), into which slot-shaped heating band bearings (27) the heating band (14) engages by an edge portion and via which support structure (19) the heating band (14) is electrically insulated from the casing (13).

18 Claims, 8 Drawing Sheets

(51) Int. Cl.
*F01N 13/00* (2010.01)
*F01N 3/027* (2006.01)
(52) U.S. Cl.
CPC .... *F01N 13/0093* (2014.06); *H05B 2203/003* (2013.01); *H05B 2203/022* (2013.01)
(58) Field of Classification Search
CPC .. F01N 3/2013; F01N 13/0093; F01N 13/009; F01N 13/1872; F01N 2240/16; F01N 2240/40; F01N 2240/20; F01N 2610/02; F01N 26/102; H05B 3/32; H05B 3/06; H05B 3/24; H05B 2203/003; H05B 2203/022; B01D 53/9422; B01F 5/0694; B01F 35/93; B01F 23/2132; B05F 25/3141; B05F 25/4523; Y02A 50/20; Y02T 10/12
See application file for complete search history.

(56) References Cited

U.S. PATENT DOCUMENTS

| | | | |
|---|---|---|---|
| 8,904,764 B2 | 12/2014 | Baier et al. | |
| 9,115,622 B2 | 8/2015 | Baier et al. | |
| 10,309,279 B2 | 6/2019 | Bartolo | |
| 2021/0298128 A1* | 9/2021 | Welder | ............... F01N 3/2013 |
| 2022/0178290 A1* | 6/2022 | Gaiser | ............... B01D 53/9418 |

FOREIGN PATENT DOCUMENTS

| | | | | |
|---|---|---|---|---|
| EP | 0903476 A1 * | 3/1999 | | |
| FR | 2117287 A5 | 7/1972 | | |
| FR | 3085428 A1 | 3/2020 | | |
| GB | 214058 A | 4/1924 | | |
| JP | 04339122 A | 11/1992 | | |
| JP | 05059939 A | 3/1993 | | |
| WO | 2017151975 A1 | 9/2017 | | |
| WO | WO-2021115950 A1 * | 6/2021 | ........... | F01N 3/2013 |

OTHER PUBLICATIONS

Written Opinion of the International Searching Authority dated Mar. 3, 2022 in parent International application PCT/EP2021/073132. Machine translation included.
International Search Report dated Mar. 3, 2022 in related parent International application PCT/EP2021/073132.

* cited by examiner

ELECTRICAL HEATING UNIT

BACKGROUND

The present disclosure relates to an electrical heating unit for introduction into the exhaust gas system of an internal combustion engine, in particular upstream with respect to an exhaust gas purification unit, for instance a catalytic converter, which requires a temperature higher than the ambient temperature for operation, said electrical heating unit comprising a casing and at least one resistance heating element which is designed as a band and is retained inside the casing, the at least one heating band having a meandering pattern and the flat face thereof extending parallel or substantially parallel to the longitudinal axis of the casing.

For reducing the emissions of an internal combustion engine, for example, a diesel engine operated in a vehicle, exhaust gas purification units are intercalated in the exhaust gas system. In this case, they are particle filters as well as catalytic converters, in particular oxidation catalytic converters and SCR catalytic converters. Particle filters are used to reduce soot emissions. An SCR catalytic converter is used to reduce the NOx emission. An oxidation catalytic converter integrated in an exhaust gas purification system supports a passive regeneration of the particle filter and the conversion rate on the SCR catalytic converter. In addition, it can be used to increase the exhaust gas temperature. If the exhaust gas temperature is to be increased, the oxidation catalytic converter is exposed to hydrocarbons which react exothermally on said oxidation catalytic converter. For the operation of an SCR catalytic converter, a reducing agent is necessary. Said reducing agent is introduced into the exhaust gas system upstream of the catalytic converter. For this purpose, an aqueous urea solution is used. While a separation of soot particles with a particle filter occurs independently of temperature, the catalytic converters must be in a certain temperature range to be able to perform their exhaust gas purification function—the catalysis of certain substances. The lower temperature limit of said catalytic converters is also referred to as light-off temperature or activation temperature. In such a catalytic converter, the conversion rate is still low when the activation temperature is reached. The conversion rate increases with increasing temperature up to a temperature maximum. Said temperature maximum in turn depends on the design of the catalytic converter. In such catalytic converters, the activation temperature is approximately 110 to 130° C., wherein this value too is dependent on the concrete design of the catalytic converter.

As a general rule, the catalytic converters intercalated in the exhaust gas system are heated by the exhaust gas flowing into or through said catalytic converters. Immediately after the start of the engine, the exhaust gas, still does not have a sufficient temperature, and it takes a certain amount of time, sometimes even several minutes, until such a catalytic converter has reached its activation temperature due to the exhaust gas. In some cases one seeks to install at least one of the catalytic converters as close as possible to the engine, so that the exhaust gas cools as little as possible before it reaches the catalytic converter. In systems which use multiple exhaust gas purification units connected one after the other, for example, in an oxidation catalytic converter, followed by a particle filter which in turn is followed again by an SCR catalytic converter, it is understood that the catalytic converters located further downstream, as with the SCR catalytic converter described above, are heated to the operating temperature by the exhaust gas only after a considerably longer engine operation time. In order to accelerate the heating of catalytic converters, heating elements have been disclosed, which are intercalated upstream of an exhaust gas purification unit in the exhaust gas system. These electrical heating elements are located within the exhaust gas flow. The exhaust gas which flows by, during operation of such a heating element, is heated and can accordingly deliver more heat to the exhaust gas purification unit connected downstream with respect to the heating element. According to another embodiment the catalytic converter substrate itself is heated by means of an electrical resistance, in order to bring said catalytic converter more rapidly to its activation temperature. In such a design, one or more heat conductors are arranged on the lateral surface of the catalytic converter substrate, which are heated when energized, and this heat is then transferred to the catalytic converter substrate. Such heating systems are conventional resistance heating systems. The heat conductors are kept at a certain temperature and energized until the exhaust gas purification unit or the catalytic converter substrate has reached its activation temperature. The time required to heat the exhaust gas purification unit is dependent on its size. In catalytic converters, ceramic substrates made of cordierite, for example, are commonly used, onto which the catalytic coating is applied.

An electrical heating unit for these purposes is known from U.S. Pat. No. 10,309,279 B2. This heating unit has a plurality of individual elongate heating elements which extend from a radially external casing along a curved path or an approximation of such a curved path in individual straight sections angled with respect to one another from the radially external casing to a frame portion located in the center. According to an embodiment, the heating elements can be designed as heating bands. The flat side of the heating bands runs parallel to the longitudinal axis of the casing. A first group of electrical heating elements extends between the external casing and the central frame portion along a first curvature direction. A second group of heating elements is oriented in opposite direction. At intersection points, the heating elements are connected to one another. The design of the heating element surface is quite complicated in this prior art, wherein the heating power is indicated to be approximately 5 kW in a 48 V on-board network. However, the use of a plurality of individual heating elements is considered to be necessary to fill the required cross-sectional area with sufficiently heated material. The elongate heating elements are electrically contacted via the radially external casing. One aspect to be taken into consideration when heating resistance heating elements, in particular heating bands, to the desired temperatures, indicated to be between 200° C. and 1000° C. in this prior art, is the thermal expansion of same. In particular, no short circuiting should occur as a result of a thermal expansion.

An electrical heating device is known from JP 04339122 A1. The heating band of this previously known heating unit has a meandering pattern and is arranged with its flat side running parallel to the longitudinal axis of the casing. In the region of the bends, the heating band is retained embedded in retention structures designed as insulators.

WO 2017/151975 discloses a heating unit for heating fluids. As heating element, a heating band is used, which is also arranged in a meandering pattern. Said heating band is retained by the enclosure of interconnecting dielectric holders.

JP 05059939 A discloses a heating band having a meandering pattern, integrated in the substrate of a catalytic converter. Retention means for retaining the heating band are therefore not necessary in this prior art.

The on-board networks operated at higher voltages, in particular of future vehicles, operated at voltages of 48 V or more, allow the use of particularly powerful heating units. It is all the more important to ensure operation according to the intended purpose even at higher temperatures.

SUMMARY

Proceeding from this background, an aspect of the present disclosure is to propose an electrical heating unit for introduction into the exhaust gas system of an internal combustion engine, the heated resistance heating element of which ensures a simple production and a reliable operation even at high electrical powers.

This aim is achieved according to the disclosure by an electrical heating unit wherein the heating unit comprises at least one support structure which is arranged on the end face relative to the heating band and which is mechanically connected to the casing and has slot-shaped heating band bearings to retain the heating band inside the casing, in which slot-shaped heating band bearings the heating band engages by an edge portion and via which support structure the heating band is electrically insulated from the casing.

In this electrical heating unit, the at least one heating band running in a meandering pattern is retained inside the casing. A heating band can be brought into a meandering pattern by simple means. It only requires the provision of bending sites, in order to provide heating band sections that typically run parallel. The small side of a heating band formed in this way points, on the inflow side opposite the inflow direction of the exhaust gas and therefore represents no significant obstacle to the flow of the inflowing exhaust gas, in particular no obstacle to flow that significantly increases the exhaust gas back pressure. The material thickness of the heating band is typically approximately 0.5-0.7 mm, but the heating band can also be designed to be thinner or thicker. At least one support structure is used to retain the heating band inside the casing. Said support structure is arranged on the end face with respect to the heating band and is mechanically connected to the casing. Typically, the heating unit has two support structures, wherein one support structure is arranged on the inflow side and the other on the outflow side with respect to the heating band. If two support structures are used, the width of the heating band (extent in the direction of the longitudinal axis of the casing) can be designed to be correspondingly large. In heating bands that are smaller with respect to their width, a support structure present on only one end face can be sufficient. The support structure is equipped with slot-shaped heating band bearings. The heating band engages by an edge section in the slot-shaped heating band bearings. Furthermore, it is provided that the heating band is electrically insulated from the casing via the support structure.

In a design of the heating unit with a respective support structure arranged on the end face, the heating band is retained by positive-locking connection in longitudinal extent of the casing inside said casing by the support structures. This makes it possible to design the heating band bearings as floating bearings, so that, in case of a longitudinal thermal expansion of the heating band, the portion of the heating band engaging in the heating band slot of a heating band bearing is retained in a manner so that it can be shifted in the direction of its longitudinal extent. The expansion of the heating band in a meandering pattern can be used in order to attach the heating band in the direction of the longitudinal extent of its heating band sections which typically run parallel, by an appropriate arrangement of heating band bearings in the immediate vicinity of one or more heating band bends. For this purpose, in transverse direction, the heating band sections are attached by engagement in the slot-shaped heating band bearings. Therefore, it is sufficient if the support structure is mechanically connected and thus attached at only a few sites to the inner lateral surface of the casing.

In this heating unit with its support structure, it is advantageous that the heating band can also effectively release heat in the region of its heating band bends and the heating band bends are also exposed to exhaust gas inflow. Thereby, overheating of the heating band bends is likewise avoided as is the loss of flow cross-sectional area, which must be accepted in the case of a radial bearing of the heating band. To that extent, in this heating unit, the total cross-sectional area of the casing can be used for the exhaust gas throughflow. Depending on the perspective, this reduces the necessary diameter of the casing or the exhaust gas back pressure.

According to a design of such a support structure, said support structure is formed in the manner of a frame formed by multiple struts running transversely to the longitudinal course of the heating band sections. The struts, on their side facing the heating band, bear the slot-shaped heating band bearings. For this reason, the struts can also be referred to as comb bars. Such a strut can be a bar-shaped metal section which faces by its small side the heating band and of which its small side bears the slot-shaped heating band bearings. Such a strut can be multiply angled in its extension over the front surface of the heating band, if this is appropriate, for example, based on the cross-sectional geometry of the casing. In such a design of the support structure, by such struts, whose small side is exposed to inflow of the exhaust gas, the exhaust gas back pressure is also not significantly increased. At the same time, by such a design of the struts or the frame-like support structure formed therefrom, sufficient stability, for example, with respect to torsion, is provided. Such a frame-like support structure can be provided by multiple individual struts which are not connected to one another. In the case of larger cross-sectional areas, for stabilizing the struts and thus the support structure, said struts will be connected to one another by cross-connectors. Also possible is the design of two such struts in the form of double struts with hat-shaped profile, wherein these two struts face one another by their open sides and are adjoiningly connected by their legs. Such a design of a portion of such a support structure is appropriate if the heating band is to be retained in the center of its two struts arranged apart from one another by the meandering pattern of flat extension, for example, in the case of a circular casing.

An electrical insulation of the heating band from the casing can be provided by bearing elements which are produced from an electrically nonconductive material, for example, a ceramic, and which in turn comprise the slot-shaped heating band bearing. Such bearing elements are connected to the support structure. In a design of the support structure with struts, produced from metal bars, the side facing the heating band can comprise recesses, typically U-shaped recesses at the sites where such a bearing element is to be positioned, in which recesses such a bearing element made, for example, of ceramic, is inserted and retained. Such a cohesive connection is possible but not absolutely necessary, and in particular it is not necessary when such a support structure is arranged toward both end faces of the heating band and the bearing elements engage by positive-locking connection in the direction of the longitudinal extent of the heating band sections in the recesses for the bearing elements. If desired, a connection of such bearing elements to the support structure can be carried out by using a suitable glue or also by a welding connection or also by any other connection types suitable for this purpose.

Typically, in this electrical heating unit, the heating band bearings, that is to say the bearings which retain the at least one resistance heating element, are connected, with intercalation of bearing elements, to the support structure. The bearing elements are electrically nonconductive, so that the resistance heating element is electrically insulated from the support frame. In order to meet the particular requirements for such an electrical heating unit for heating a gas flow, in particular when the electrical heating unit is heated to temperatures of 700° C.-800° C. and the heating unit is also to withstand temperatures of 900° C.-950° C., which certainly can occur in passenger cars, for example, when the heating unit is also used in the exhaust gas system of an internal combustion engine, then, according to an embodiment, the bearing elements are retained in each case in a bearing element recess of the support structure. Such a bearing element recess can be a U-shaped recess into which such a bearing element is inserted. According an alternative design, the bearing elements are connected to the support structure with intercalation of a compensation element. The compensation element is a structured activated solder strip or a section of such an activated solder strip. Said strip is formed by an alternation of first and second sections, which first and second sections are connected to one another by members. The first and second sections are arranged offset with respect to one another in the direction of the compensation effect of the compensation element and thus in spacing direction between the bearing element and the bearing element recess. The first sections are soldered with to one joining partner, for example, the bearing element recess, and the second sections are soldered to the other joining partner, the bearing element located in a bearing element recess. Thus, the activated solder strip not only forms the compensation element to compensate for production tolerances and to compensate for different thermal expansion coefficients between the bearing element and the support structure. The activated solder strip at the same time is used to establish the desired joining connection between the bearing element and the bearing element recess. Thus, the bearing elements are undetachably connected to the support structure and at the same time mounted in a bearing element recess due to the structured activated solder strip as compensation element. The particular feature of this design is that the members connecting the first and second sections lie freely, and therefore have no contact with one of the two joining partners and are thus not soldered to the bearing element or to the bearing element recess. In a clever way, the use of such a structured activated solder strip exploits the property of the latter that a solder connection occurs only where the activated solder strip is in contact with a joining partner, that is to say, for example, in contact by its first sections with the bearing element recess and in contact by its second sections with the bearing element. If the structuring of the activated solder strip is a sinusoidal corrugation, the first and second sections in each case are in contact, by their peaks facing away from one another, with one of the two joining partners. In principle, this is sufficient, since as a general rule no shearing forces have to be absorbed between the bearing element and the bearings recess or the support structure. Activated solder strips which have a different structuring with the provided alternation of first and second sections can also be used, for example, a trapezoidal or sawtooth-shaped profiling or a mixed form of different cross-sectional profilings. The first sections and the second sections then are in contact, by a larger area corresponding to the structuring, with the respective joining partners.

The activated solder used for the above-described purposes is selected in terms of its joining temperature so that said temperature is higher than the maximum expected gas temperature that can flow through the electrical heating unit. If the heating unit is intercalated in the exhaust gas flow of an internal combustion engine of a motor vehicle, exhaust gas temperatures of 900° C.-950° C. are to be expected. In such a case, an activated solder will be used, which is soldered at temperatures higher than said temperature at a temperature of 1000° C. to 1050° C.

In the context of these explanations, the term "activated solder" should be understood to mean a solder which, without prior wetting of one or both of the joining partners, wets them where the activated solder at appropriate temperature is in contact with a joining partner. The joining is carried out in a vacuum furnace. Activated solders contain surfactant elements which, for the desired wetting, react with oxygen from the joining partner. For this reason, the joining is carried out in a vacuum furnace. Such a reaction only occurs at sites of the activated solder strip where it is in contact with a joining partner from which the oxygen required for the reaction originates.

According to another design of the bonding of the bearing element to the support structure, the bearing elements are retained by positive-locking connection in a respective bearing element recess. For this purpose, such a bearing element recess is undercut in the direction toward the front surface of the support structure. Furthermore, means are provided for retaining such a bearing element inserted in a bearing element recess in transverse direction with respect to the plane of the bearing element recess by positive-locking connection therein. For this purpose, for example, correspondingly contoured strike plates can be used, one of which in each case one is applied on each side of the support structure providing the bearing element recesses. These strike plates have a section protruding over the lateral opening of a bearing element recess. In such an embodiment, the use of a compensation element is not necessarily envisaged but can have advantages. In such an embodiment, such a compensation element does not have to be designed as activated solder strip, since the bearing element is retained by positive-locking connection in a bearing element recess.

In heating units designed with larger cross-sectional area, the support structure will typically be designed with multiple struts comprising the slot-shaped heating band bearings. Thus, between two edge struts located in the immediate vicinity of the bending region of the heating band, one or also multiple additional struts can be arranged. Then, each heating band section, depending on the design of the support frame, is retained by multiple heating band bearings, at most a number of heating band bearings corresponding to the number of struts provided. By means of these heating band bearings, a longitudinal thermal expansion can be countered in two different ways. There is the possibility of designing the heating band bearings as floating bearings, so that a heating band section engaging by an edge section therein is not negatively affected in terms of its longitudinal expansion by the heating band bearings. However, providing one or more struts supporting heating band bearings between two edge struts also allows the possibility of designing the heating band bearings as fixed bearings, by which a movement of the heating band section engaging therein in the direction of its longitudinal extent is prevented. The length of the heating band section is then subdivided into a corresponding number of sectors which, with regard to thermal expansion, are uncoupled from one another by the heating band bearings. The extent of an expansion-caused deformation which manifests itself in a flexion of a heating band section can be controlled thereby, so that contacts between adjacent heating band sections are avoided even if said heating band sections are heated to higher temperatures. It is also possible to design a support frame with heating band bearings, of which some are designed as fixed bearings and others as floating bearings. In such an embodiment, the heating band bearings of the two edge struts located in the immediate vicinity of the bending region of the heating band, which is the result of the design in a meandering pattern, can be designed as fixed bearings, while the heating band bearings of the one or more struts located between these two struts are floating bearings. In the implementation of such a support structure, it is ensured that the bends of the heating band do not come in contact with the casing or come too close to the inner surface of said casing even in the case of an extreme thermal expansion of the heat band. Thus, the electrical insulation provided by the exhaust gas between the heating band and the casing, which is typically made of steel, is maintained even at high temperatures.

A longitudinal thermal expansion can also be compensated by articulation regions introduced transversely to the longitudinal extent of the heating band sections into said heating band sections. Such an articulation region can be provided by a beading extending over the width of the heating band and thus parallel to the flow direction of the exhaust gas flowing through the heating unit. This bulge created with respect to the plane of the heating band section reacts in the manner of a hinge with respect to the adjoining heating band sections. Such a design of the heating band is particularly appropriate in the case of a connection of the support structure to the heating band via fixed bearings.

The heating band can also have successive stiffening structures in the direction of a longitudinal extent, such as, for example, beading. The structures are set off with respect to the plane of the heating band or its heating band sections and therefore exposed to the inflow of the exhaust gas flowing through. This exhaust gas makes for turbulence and consequently ensures a better heat transfer from the heated heating band to the exhaust gas which is relatively cool in comparison. Also possible is an embodiment in which such stiffening structures contain a perforation of the heating band section, and the exhaust gas, when applied against such a structure which is set off, for example, like a hood, is guided onto the other side of the heating band. This too promotes a heat transfer of heat into the exhaust gas flow.

Due to the forming of the heating band in a meandering pattern, the respective last heating section runs parallel or approximately parallel to the inner surface of the casing. Therefore, an electrical connection of the heating band is possible in many ways and namely, for example, using an electrical connection bolt which reaches through the casing and is permanently mechanically connected to said casing, typically welded to it. The flat side of the in this regard last heating band section, which faces radially outward, due to its area, sufficiently offers possibilities of being able to connect the electrical conductor of such an electrical connection bolt thereto, for example, by welding of same.

The course of the heating band in a meandering pattern can have a single meandering pattern. Such a single meandering pattern, as provided in an embodiment example, is overlain by a second meandering. The second meandering typically runs at a right angle with respect to the first meandering of the heating band. This enables a design of the first meandering with identical leg length or also with changing leg length, which first meandering in turn is brought into a meandering pattern such that multiple meander sections of the first meandering lie next to one another. In such a design of the heating band, for filling the cross-sectional area, multiple meander sections of the second meandering lie next to one another. In the case of an even number of such meander strands of the second meandering, the electrical connections can be arranged on the same side of the heating unit. This is advantageous for the running of electrical lines on the vehicle. In such a design of the heating element, it is advantageous that a greater heating band length can be accommodated over the cross-sectional area of the electrical heating unit, whereby the heating band and thus the heating unit can be operated with a higher heating power. In addition, a heating band formed in this way is particularly dimensionally stable due to the shorter leg of the first meandering. For this reason, in principle, fewer heating band bearings are necessary for retaining the heating band. Depending on the design of the geometry of such a heating band formed with double meandering pattern, a 15 to 20% savings of heating band bearings can be achieved, with respect to a single meandered heating band.

In a heating band formed in this way, the large majority of the bends are spaced from the casing, therefor the heating band can also be mounted on said bends. A mounting of the heating band on legs and bends of the first meandering attaches the heating band in two directions.

The amplitude of the first meandering can be the same over the meander sections of the second meandering overlying said first meandering. In order to optimally fill the cross-sectional area of the heating unit, it is entirely possible that the edge meander sections, toward their center, have an increasing amplitude of their first meandering. This is advantageous in the case of a heating unit with a round, in particular circular, cross-sectional geometry. By varying the amplitude of the first meandering and of the second meandering overlying said first meandering, the heating band geometry can be adapted to almost any cross-sectional geometry of the heating unit. This includes oval or also hexagonal cross-sectional geometries, to give only a few examples. By means of the second meandering, this is successfully achieved without the amplitude of the first meandering having to have sizes such that the legs extending in direction of the amplitude have a length such that they would have to be attached by additional bearing elements to maintain the desired dimensional stability also during the heating.

Furthermore, in such a design of the heating band, an improved uniform temperature distribution over the cross-sectional area of the heating unit could be observed.

In the electrical heating unit according to the disclosure, it is entirely possible to arrange multiple heating bands one after the other in the flow direction of the exhaust gas.

The electrical power possible with such an electrical heating unit is obtained via the dimensioning the heating band, which is to say: via the length and the cross-sectional area thereof.

In such an electrical heating unit, the support structure extending over the cross-sectional area of the heating unit can be exploited in order to use said support structure at the same time as uniform distribution element by an appropriate design of flow interruptions. This can be achieved by providing different throughflow openings and/or by arranging throughflow openings in a manner of a grid, whereby the throughflow openings are correspondingly arranged over the cross-sectional area for the purposes of the desired uniform flow distribution. Thereby, it is achieved that the inflowing exhaust gas flow is heated uniformly, in any case much more uniformly, over its cross-sectional area, with the advantage that the electrical heating unit can be arranged accordingly closer to the exhaust gas purification unit to be heated. Finally, no additional flow distance then needs to be taken into consideration for the uniform temperature distribution between the heating unit and the exhaust gas purification unit in the design of the exhaust gas purification system. In addition to a uniform distribution of the temperature, a support structure designed in this way also brings about a uniform distribution of substances that may be entrained in the exhaust gas flow, such as, for example, a reducing agent introduced therein, which is necessary for the operation of an SCR catalytic converter.

Advantageously, a support structure designed in this way is located on the inflow side of the heating band.

By means of such an electrical heating unit, in an on-board network of a vehicle, operated at appropriate voltage, short-term powers of certainly more than 10 kW can be provided, for example, powers of approximately 15 kW and more. The short-term operation of such a heating unit before the start of the engine is particularly advantageous. The heating unit itself is typically arranged immediately upstream of a catalytic converter, so that said catalytic converter is at least at its light-off temperature when the internal combustion engine is started. Heating of the catalytic converter occurs by heat transfer by the gas heated inside the heating unit, by heat radiation or by heat conduction. The latter occurs via the casing which typically continues into the catalytic converter arranged downstream in the flow direction of the exhaust gas. In addition, heat is stored in the heating band and the support frame, particularly if it is made of metal, so that during or immediately after an engine start, exhaust gas emitted by the internal combustion engine, before reaching the catalytic converter connected downstream of the heating unit, strikes not only impinges upon a preheated catalytic converter which is above its light-off temperature but also is itself already preheated by absorbing heat from the heating unit. This counteracts a cooling of the preheated catalytic converter by the initially cool inflowing exhaust gas. A heating of the heating band to 600° C.-700° C. is considered sufficient to be able to carry out already during an engine start an effective exhaust gas purification, in particular with regard to denitrification.

The heating unit can naturally also be operated during ongoing operation of the internal combustion engine, in order to bring about a temperature increase in the exhaust gas, should the exhaust gas temperature be insufficient for the reaction to be carried out in a downstream exhaust gas purification unit.

BRIEF DESCRIPTION OF THE DRAWINGS

The flowing description is provided using an embodiment example in reference to the appended figures.

DETAILED DESCRIPTION

Figure 1:
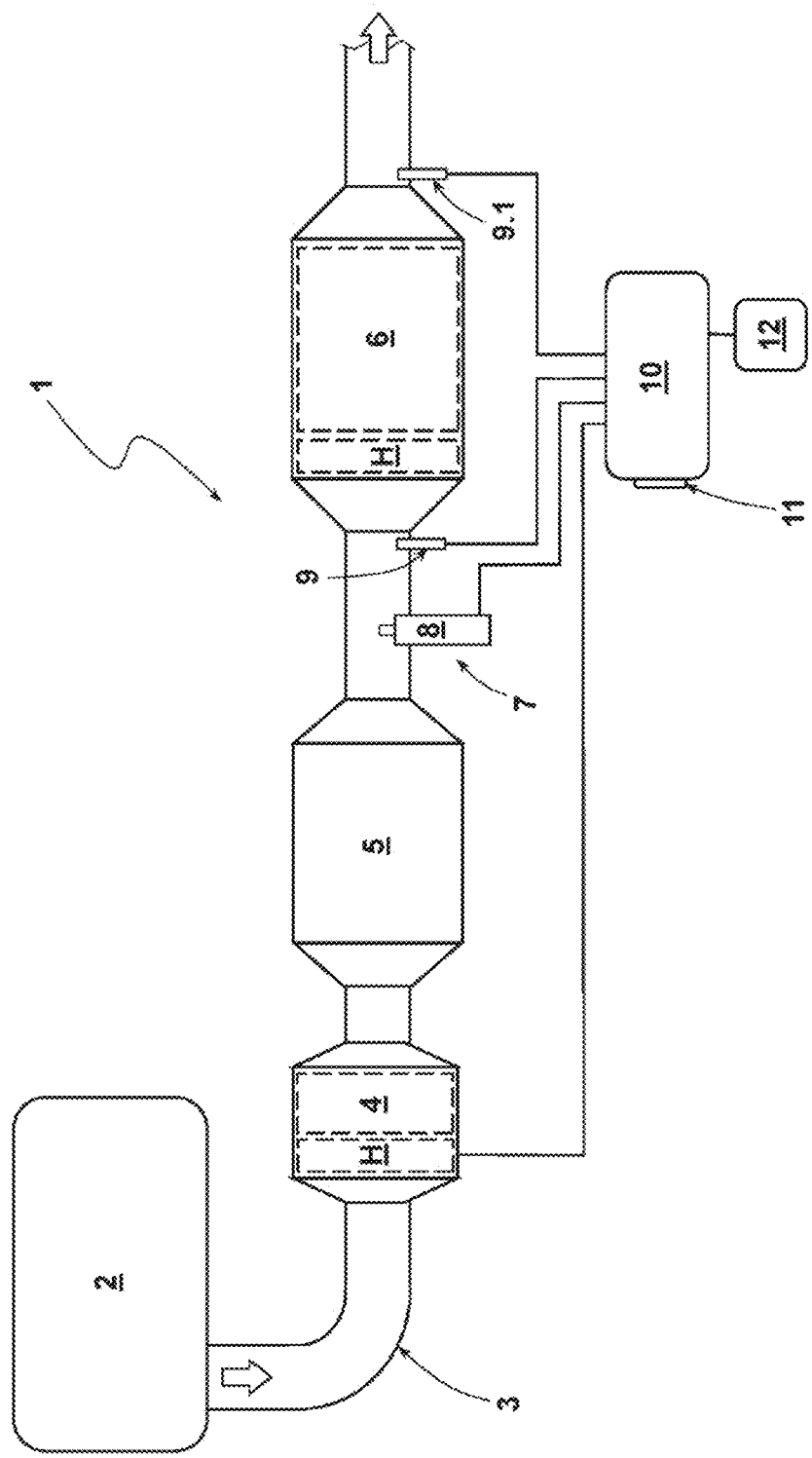
FIG. 1 shows a schematic block diagram of an exhaust gas purification system of an internal combustion engine with two catalytic converters and a respective electrical heating unit connected upstream of each catalytic converter.

A heating unit H is provided and accordingly arranged to heat a gas flow upstream with respect to a unit, for example, a catalytic converter, which for its operation requires a temperature higher than the ambient temperature. It is described below in reference to an embodiment example in which the heating unit H is intercalated in the exhaust gas system of an exhaust gas purification system 1. The purpose of use of the heating unit H is not limited to such an application but instead the heating unit can be used in the same way in multiple other uses.

An exhaust gas purification system 1 is connected to a diesel engine 2, as exemplary internal combustion engine, of a vehicle not represented in the figure. The individual units of the exhaust gas purification system 1 are intercalated in the exhaust gas system 3 of the diesel engine 2. The exhaust gas purification system 1 of the represented embodiment example includes an oxidation catalytic converter 4. In the same housing as the oxidation catalytic converter 4, an electrical heating unit H is located immediately upstream thereof. Connected downstream in the flow direction of the exhaust gas with respect to the oxidation catalytic converter 4 or the unit consisting of the heating unit H and the oxidation catalytic converter 4 is a particle filter 5, which filters the fine particles entrained in the exhaust gas flow, such as, for example, soot particles, out of the exhaust gas flow. Said fine particles accumulate on the inflow-side surface of the diesel particle filter 5.

In the flow direction of the exhaust gas flowing through the exhaust gas system 3, an SCR catalytic converter 6 connected downstream of the particle filter 5 is provided. Since the SCR catalytic converter 6 and the oxidation catalytic converter 4 require a certain operating temperature in order to be able to carry out the desired reactions on their catalytic surfaces, a heating unit H is also arranged immediately upstream of the SCR catalytic converter 6 in the same housing. The heating units H used for the two catalytic converters 4, 6 have the same design.

Connected downstream of the outlet of the particle filter 5, the exhaust gas system 3 bears a reducing agent supply 7 which, for the sake of simplicity, is shown only with its injector 8 extending into the exhaust gas system 3. Via this injector, a reducing agent for operating the SCR catalytic converter 6 is mixed with the exhaust gas flow flowing through the exhaust gas system 3. The reducing agent (ammonia) introduced in liquid form as precursor into the exhaust gas flow is stored in a reducing agent container not represented in the figure, which is connected via a reducing agent line to the injector 8. In the embodiment example represented, urea solution (urea) is introduced as ammonia precursor via the injector 8 into the exhaust gas system 3.

For the acquisition of characteristic data of the exhaust gas flow flowing through the exhaust gas system 3, which is necessary for operation of the exhaust gas purification system 1, the exhaust gas purification system 1 has corresponding sensors. In the figure, for example, two temperature sensors 9, 9.1 are shown, wherein the temperature sensor 9 is connected upstream of the SCR catalytic converter 6 in the flow direction of the exhaust gas, and the temperature sensor 9.1 is connected downstream of the SCR catalytic converter 6. The exhaust gas purification system 1 can include additional sensors, in particular also temperature sensors before and after the oxidation catalytic converter 4 and/or the particle filter 5 as well as pressure sensors or other sensors.

A control device 10 is used for actuating the exhaust gas purification system 1. The control device 10 of the represented embodiment example has an interface 11 via which the control device 10 is connected to an engine management of the vehicle, which is not represented in the figure. A characteristic map memory 12, in which the characteristic field data relevant for the exhaust gas flow is stored, is associated with the control device 10.

The exhaust gas purification system 1 can include additional components such as, for example, one or more acoustic modules, a reducing agent slip catalyst, connected downstream of the SCR catalytic converter 6, or the like.

The components of the exhaust gas purification system 1, through which exhaust gas flows, are heat insulated (not represented in the figure), in order to minimize cooling of the exhaust gas in its flow section from the diesel engine 2 to the oxidation catalytic converter 4 and to the SCR catalytic converter 6. This measure also helps keep the catalytic converters 4, 6 at operating temperature longer when the diesel engine 2 is switched off for a certain time due to, for example, a travel interruption or a pause.

Below, the heating unit H of the oxidation catalytic converter 4 is explained in greater detail. The heating unit H connected upstream of the SCR catalytic converter 6 has exactly the same design.

Figure 2:
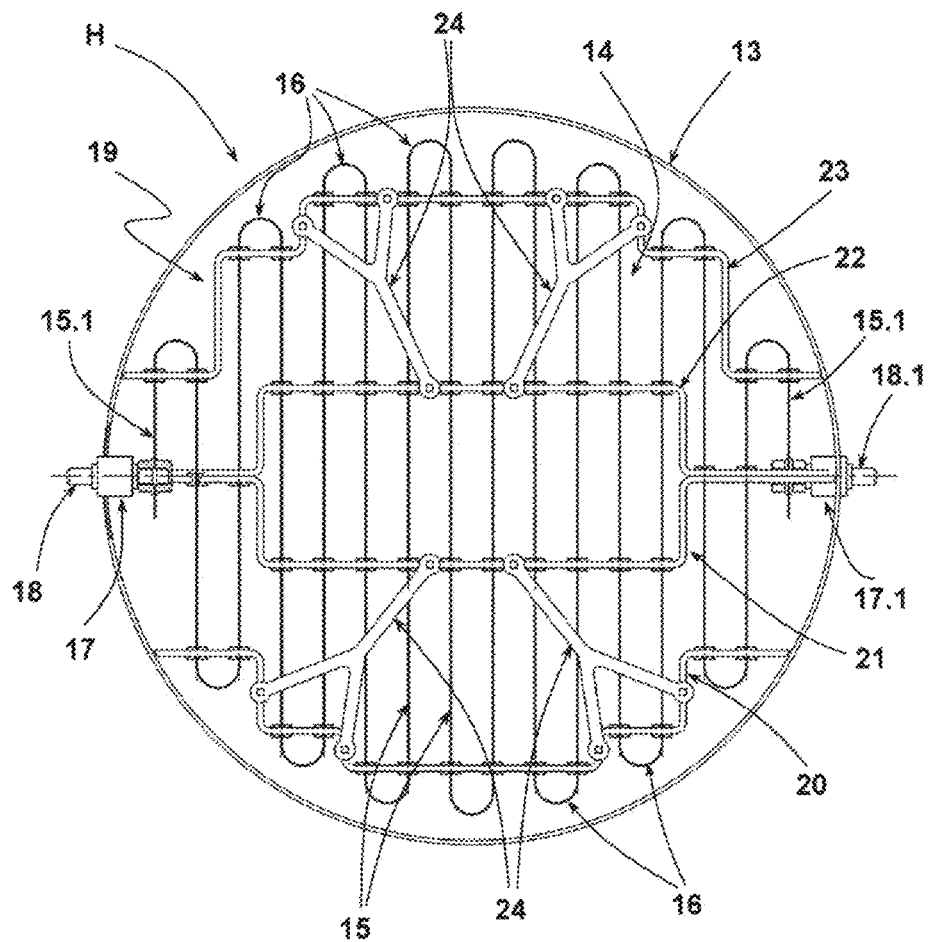
FIG. 2 is a front side view of a heating unit of the exhaust gas purification system according to FIG. 1.

Referring next to FIG. 2, the heating unit H includes a casing 13 made of steel sheet. The casing 13 continues into the housing of the oxidation catalytic converter 4. The cross-sectional area of the casing 13 is circular in the embodiment example represented. The electrical heating unit H has, as electrical resistance heating element, a heating band 14 which fills the cross-sectional area provided by the casing 13 in a meandering pattern. Due to the forming of the heating band 14 in a meandering pattern, said heating band has a plurality of parallel heating band sections 15, wherein two adjacent heating band sections are connected to one another in each case by only one heating band bend 16. The length of the heating band sections 15 increases from an edge end of the heating band 14 to the center of the casing 13 and subsequently decreases again in order to be able to match in this way the inner contour of the casing 13. The heating band 14 is electrically contacted on both of its end-side heating band sections 15.1 by respective electrical end bolts 17, 17.1, the electrical conductor 18, 18.1 of which is connected to the respective end-side heating band section 15.1. The connection bolts 17, 17.1 are welded to the casing.

The heating band 14 is retained in the casing by a support structure 19 designed in the manner of a frame in the represented embodiment example. The support structure 19 includes multiple struts 20-23 which are connected internally by their front-face end to the casing 13. The struts 20 and 21 as well as 22 and 23 are connected to one another by cross-connectors 24. The struts 21, 22 are connected to one another by their hat-shaped profiling in the region of their legs. The strut pair formed by the struts 21, 22 is located in the region of the center of the casing 13. The other two struts 20, 23 are located in the edge region of the flow cross section of the casing 13. These struts 20, 23 are located in the immediate vicinity of the region of the heating band bends 16. Due to the circular cross-sectional area of the casing 13, the struts 20, 23 are designed correspondingly angled in order to approximately follow the curved edge course.

Figure 3:
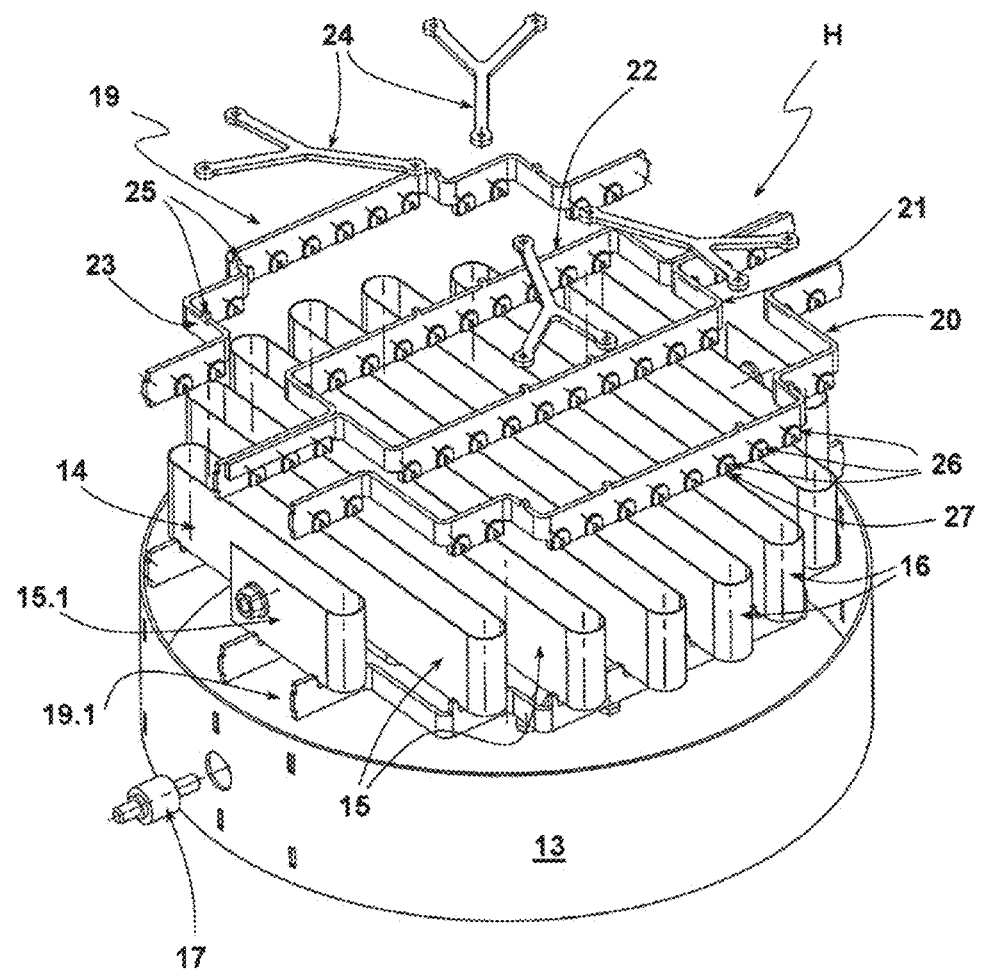
FIG. 3 shows a representation of the heating unit of FIG. 2 in an exploded view.

The struts 20-23 are provided by metal bars, as can be seen in the exploded representation of FIG. 3. For connecting the struts 20-23, said struts have, on their end-side end faces, connection extensions which engage in corresponding recesses of the casing 13 and are attached in a firmly bonded manner. For connecting the cross-connectors 24 to the struts 23-23, the bar-shaped struts 20-23 have respective upward protruding connection extensions 25 to which a cross-connector 24, having Y-shaped design in the embodiment example represented, is connected. For this purpose, the cross-connectors 25 bear end-face broadenings with a recess introduced therein, so that said broadenings can be placed onto the connection extensions 25 of the struts 20-23 and be joined to one another. In this way, the support structure 19 formed by the struts 20-23 receives sufficient stability for the required purposes.

The support structure 19 is used to retain the heating band 14 inside the casing 13. In the depicted embodiment, a support structure 19 is located on the inflow-side front surface of the heating band 14 in a meandering pattern, and a second support structure 19.1 which has exactly the same design as the support structure 19 is located on the outflow-side front surface.

The struts 20-23 of the support structure 19 are designed as comb-like on their side facing the heating band 14. Into each comb recess, a bearing element 26 is inserted. In the depicted embodiment, the bearing elements 26 are made of an electrically nonconductive ceramic. Thus, in this embodiment, the electrical insulation between the heating band 14 and the casing 13 occurs via the bearing elements 26 and the connection bolts 17 and 17.1.

Figure 4:
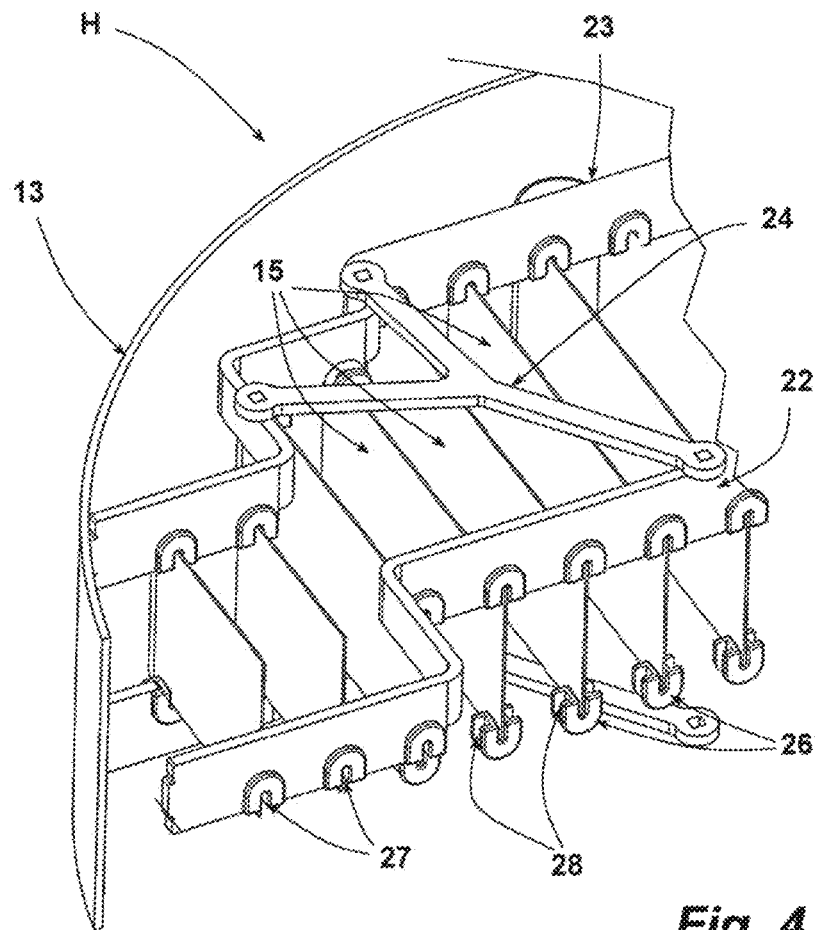
FIG. 4 is a partial cross-sectional representation of the heating unit of FIG. 2.

As can be seen in the cross-sectional representation of FIG. 4, the bearing elements 26, by their sides facing away from the heating band 14 or from the heating band sections 15, have a U-shaped design. The complementary recesses in the struts 20-23 are also designed accordingly. In FIG. 4, several bearing elements 26 are shown without the strut retaining them—the strut facing the strut 22 on the other end face. The bearing elements 26 have a slot-shaped heating band bearing 27. The clear width of the heating band bearing 27 approximately corresponds to 1.1 to 3 times the material thickness of the edge of a heating band section 15, which engages therein. The bearing elements 26 externally bear a groove 28 in which the enclosure of the U-shaped recess of a strut 20-23 engages. Thereby, the bearing element 26 is retained by positive-locking connection in transverse direction with respect to the longitudinal extent of the respective strut 20-23.

Figure 5:
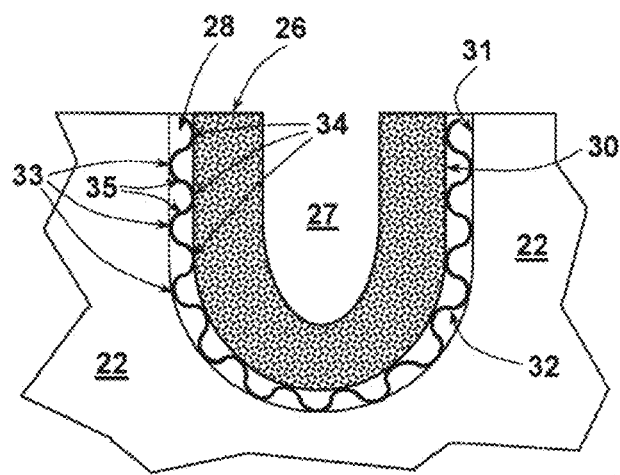
FIG. 5 is a cross-sectional representation through a section of a strut as part of a support structure with a bearing element arranged in the bearing element recess.

FIG. 5 shows, in a detail, a side view of the strut 22 with a bearing element 26 inserted into a bearing element recess 29 having a U-shaped design. The bearing element is shown in cross section. This also applies to its groove 28, the base 30 of which can be seen due to the section plane. The base 30 is spaced from the end face 31 of the bearing element recess 29, which faces the base 30. Between the end face 31 and the base 30, a structured compensation element 32 is inserted. The compensation element 32 consists of an activated solder strip with titanium as active element. In the represented embodiment example, the compensation element 32 has a sinusoidal undulation, wherein, due to the amplitude of this undulation, the spacing between the end face 31 of the bearing element recess 29 and the base 30 of the groove 28 of the bearing element 26 is spanned. In the position of the bearing element 26 inserted into the bearing element recess 29 shown in FIG. 5, with intercalation of the compensation element 32, the base 30 of the bearing element 26 acts with slight pretensioning force against the compensation element 32. Due to the above-described structuring of the compensation element 32, said element includes first sections 33 which contact the end face 31 of the bearing element recess 29, and second sections 34 which contact the base 30 of the bearing element 26. The first and second sections 33, 34 are connected to one another by members 35. The members 35 are inclined with respect to the surface of the base 30 or the end face 31. In this way, the bearing element 26 is mounted in a yielding manner in the bearing element recess 29 in transverse direction to the alignment of its heating band bearing 27. The first and second sections 33, 34 are soldered to the respective adjoining surface—the end face 31 of the bearing element recess 29 or of the base 30 of the bearing element 26. In the case of the activated solder used in the represented embodiment example for providing the compensation element 32, an activated solder which has been soldered with a temperature of approximately 1000° C. under a vacuum to the adjoining surface of the end face 31 or of the base 30 has been used. Since, the members 35 located between the first and second sections 33, 34 have no contact with a joining partner, they do not react to the temperature effect brought about under vacuum, so that these sections remain flexible for the desired bearing purposes. The compensation element 32 of the represented embodiment example has a material thickness of approximately 50 µm and a length of approximately 12 mm so as to completely fill the bearing element recess 29. In principle, it is sufficient to provide the bearing element 26 with activated solder strip only in the region of its parallel leg outer sides.

In the embodiment example represented in FIGS. 1 to 4, all the bearing elements 26 are connected to the support structure 19 in the manner described with regard to FIG. 5. It is understood that the bearing elements can certainly be connected differently to the support structure 19 in different sections of the support structure 19.

Figure 6:
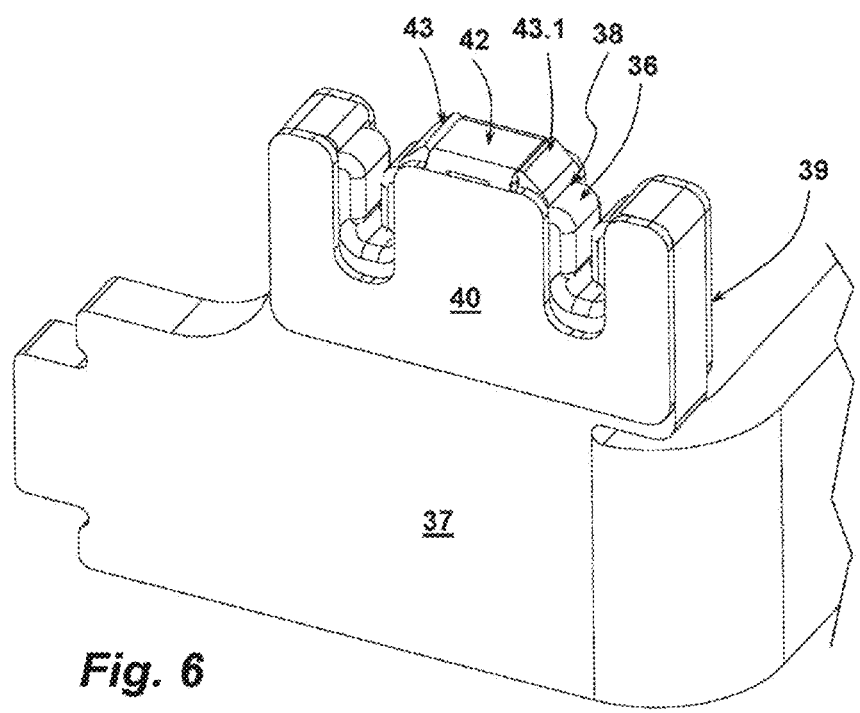
FIG. 6: is a perspective view of a section of a strut as part of a support structure of an additional heating unit with bearing elements borne thereby.
Figure 7:
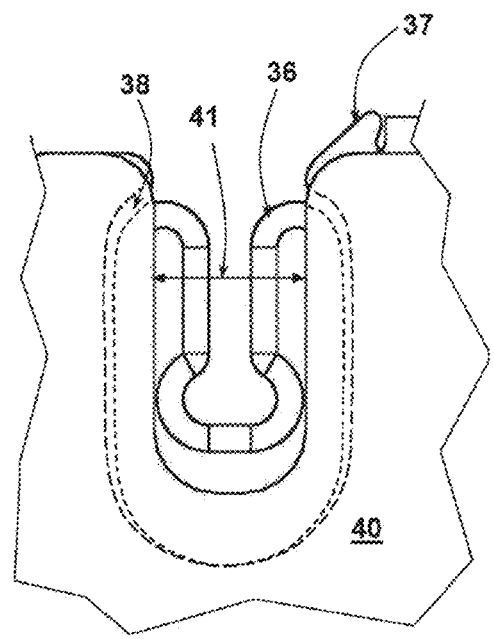
FIG. 7 is a side view onto a section of the strut of FIG. 6 with a bearing element inserted in the bearing element recess shown.

FIGS. 6 and 7 show an alternative mounting of bearing elements 36 on a strut 37 as part of a support structure of a heating unit which for the rest is not represented in detail. With the exception of the mounting of the bearing elements 36 on the support structure, as explained below using the example of the strut 37, this heating unit is the heating unit H of the preceding embodiment example. In the embodiment example of FIGS. 6 and 7, the comb-like design of the strut 37 is undercut by the bearing element recesses 38 in the direction toward the opening of same. The bearing elements 36 are therefore retained therein by positive-locking connection in the plane of such a bearing element recess 38. For attaching the bearing elements 36 in the bearing element recesses 38, two closure plates 39, 40 fastened on the flat sides of the strut 37, for example, by spot welds, are used. The closure plates 39, 40 have U-shaped recesses 41, wherein the opening width of these U-shaped recesses is smaller than the extension of the bearing elements 36 located in the plane of the strut 37. The width of the recesses 41 corresponds approximately to the opening width of the bearing element recesses 38 at their narrow site. Due to the protrusion of the closure surface by a section over the edge of the bearing element recesses 38, the bearing elements 36 are retained with positive-locking connection in the respective bearing element recess 38 also in transverse direction with respect to the plane of the strut 37 or in longitudinal direction of the heating band bearing. The two closure plates 39, 40 are connected to one another via a connection member 42 led over the end face of the strut 37. For the positioning of the closure plates 39, 40 by means of the connection member 42, the end face of the strut 37 has two casings 43, 43.1, between which the connection member 42 engages.

In this embodiment example, the possibility exists that the bearing elements 36 are retained loosely inside the respective bearing element recess 38. In this embodiment as well, between the bearing elements 36 and the end face of the bearing element recess 38, a compensation unit can be arranged. However, due to the above-described positive-locking accommodation of the bearing elements 36 in the bearing element recess 38, said compensation element does not have to be designed as structured activated solder strip.

In transverse direction with respect to the longitudinal extent of the strut 37, the bearing elements 36 can also act under pretensioning against the closure plates 39, 40, so that the bearing elements can then be retained in such a bearing element recess 38 without play and thus without rattling.

In the represented embodiment examples, the slot-shaped heating band bearings 27 are designed as floating bearings. In this way, longitudinal thermal expansion of the parallel heating band sections 15 is ensured. The spacing of the heating band bends 16 from the inner wall of the casing 13 is sufficiently large so that, even when the heating band 14 is heated to its maximum temperature, a sufficient spacing for electrical insulation is still present. In this connection, it must be taken into account that, when the heating band 14 is heated, the casing 13 is also heated and thus also expands.

As material of the heating band 14, heating band alloys which in themselves are known can be used, for example, FeCrAl, NiCr alloys. The power of the heating band 14 is determined by its length, its material thickness and its width (extent in the direction of the longitudinal axis of the casing 13).

The on-board network of the vehicle on which the exhaust gas purification system 1 is installed is operated at 48 V. The heating band 14 or the electrical heating unit H is designed to be operated at approximately 15 kW. Hereby, temperatures of up to 1000° C. can be reached. The oxidation catalytic converter 4 connected downstream of the heating unit H, in this exemplary design is already sufficiently heated after approximately 60 s after operation of the heating unit H for its temperature to be above its light-off temperature. This enables the oxidation catalytic converter 4 to be heated to its operating temperature even before an engine start, so that the desired catalytic reaction on its surface can already take place with the first emitted exhaust gas. Thereby, the total exhaust gas emission is significantly reduced, since the undesired emissions are particularly high in an internal combustion engine that is not at operating temperature.

The same is true for the SCR catalytic converter 6 which is heated before the engine start in the same way as the oxidation catalytic converter 4.

The front side view of FIG. 1 of the electrical heating unit H makes it clear that it does not provide significant exhaust gas back pressure. At the same time, due to the direct positioning of the heating unit H on the inflow side before the respective catalytic converter 4, 6, the best possible heat transfer into the substrate of the catalytic converter 4, 6 is achieved, in particular also for preheating same before an engine start or also in the case of only a small, in particular cool exhaust gas volume flows. The heating occurs by the gas present in the system, by heat radiation and heat conduction due to the heating of the casing 13 which is in electrically conductive connection with the casing of the downstream catalytic converter 4, 6.

Due to the electrical heating unit H, which is connected immediately upstream of the oxidation catalytic converter 4, said heating unit is already at its operating temperature shortly after engine start, so that, after said oxidation catalytic converter has reached a temperature higher than its light-off temperature, an additional heating can also take place by measures inside the engine and namely by the introduction of hydrocarbons into the exhaust gas flow, which react exothermally on the catalytic surface, so that, in this way, the exhaust gas flow can additionally be heated by this measure, which leads to a significant positive temperature increase of the exhaust gas. This heated exhaust gas then heats the downstream exhaust gas system 3. Furthermore, it is advantageous that, due to this measure, the oxygen catalytic converter 4 no longer has to be installed in the immediate vicinity of the engine. Therefore, when such an electrical heating unit H is used, more design freedoms exist in the design of an exhaust gas purification system for an internal combustion engine such as, for example, for a diesel engine 2, as shown in the figures.

The current temperature inside the exhaust gas system of the exhaust gas purification system can be acquired by means of the temperature sensors 9, 9.1. Typically, a temperature sensor is also arranged upstream of the oxidation catalytic converter 4. Via the control device 10, the engine start is then also controlled, which is only enabled when at least the oxidation catalytic converter 4 has been heated by the electrical heating unit H up to a temperature higher than its light-off temperature. To this extent, this process can be compared to the preheating required in older diesel vehicles.

What has been explained above using an engine start is also true when the diesel engine 2 is operated in operating modes wherein the exhaust gas temperature is not sufficient to bring the catalytic converters 4, 6 to operating temperature. The electrical heating units H can in such a case permanently ensure the necessary temperature rise in the exhaust gas flow. It is understood that said electrical heating units then do not have to be operated at the power required for a cold start. Likewise, an intermittent operation of the heating units H is possible, is a combination with the increase of the temperature in the exhaust gas system by measures inside the engine.

Figure 8:
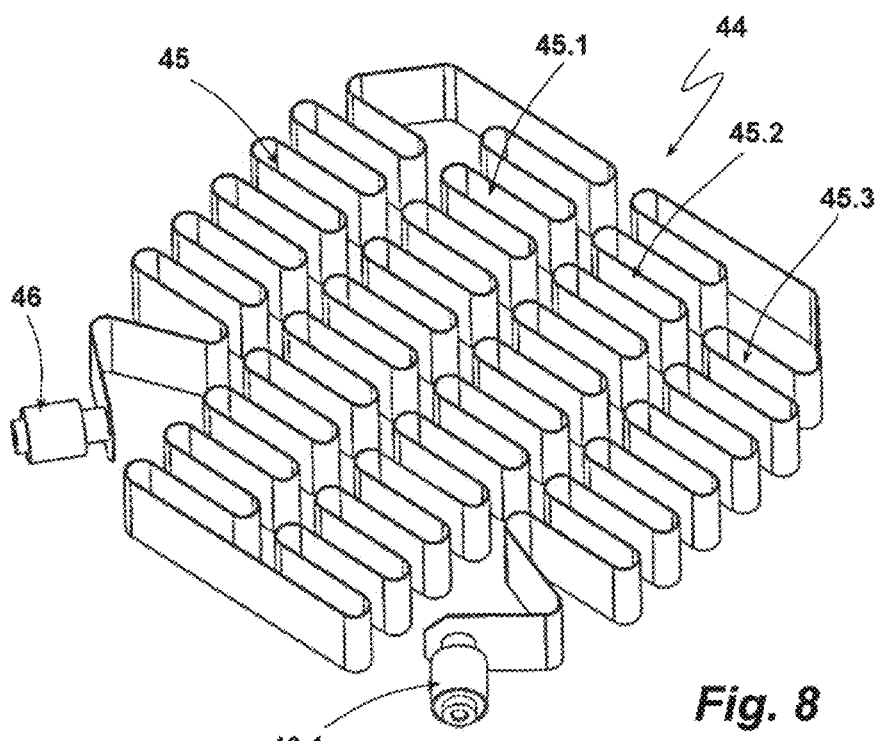
FIG. 8 is a perspective representation of a heating band according to an additional embodiment for an electrical heating unit.

FIG. 8 shows another embodiment of a heating band 44 of an electrical heating unit, for the rest not represented in greater detail, for heating a gas flow. The heating band 14 of the embodiment example described in the preceding figures has a single meandering pattern. The amplitude of the meandering of the heating band 14 runs transversely to the spacing of the two connection bolts 17, 17.1. The heating band 44 comprises a first meandering which corresponds to the meandering of the heating band 14. This first meandering is overlain by a second meandering, so that, in the case of the heating band 44, four meander sections 45, 45.1, 45.2, 45.3 are arranged next to one another. Two adjacent meander sections 45, 45.1; 45.1, 45.2; 45.2, 45.3 are connected to one another by a respective heating band section. The connection bolts 46, 46.1 located at the two ends of the heating band 44 are located on the same side.

In the case of the heating band 44, the amplitude of the first meandering in the meander sections 45, 45.1, 45.2, 45.3 is of the same size. The perspective representation of the heating band 44 clarifies that, over the cross-sectional area of the heating unit, a larger heating band length than in the embodiment example of the heating band 14 is accommodated.

Figure 9:
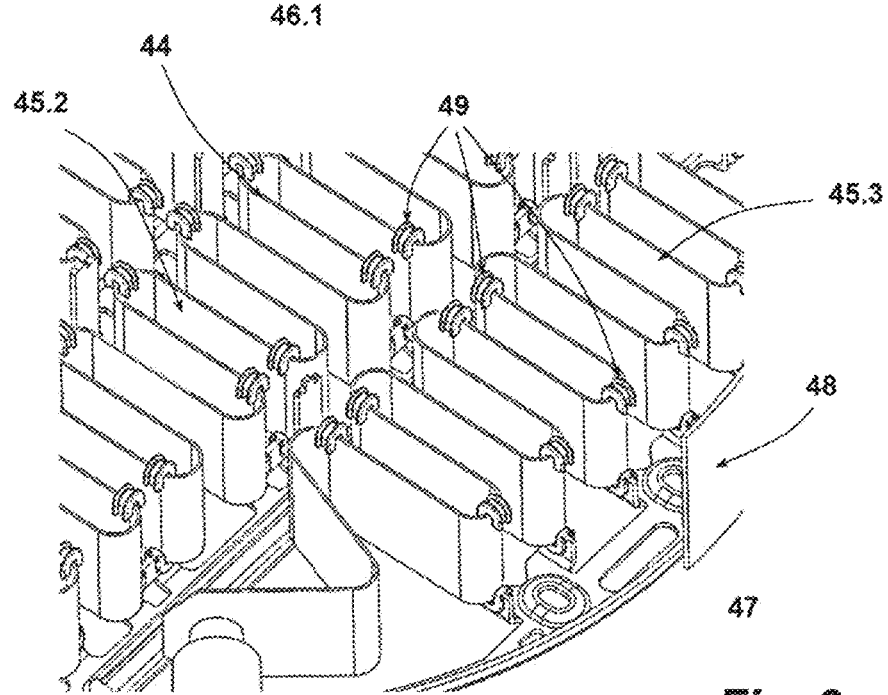
FIG. 9 is a section of the electrical heating unit with the heating band of FIG. 8 for representing the arrangement of the bearing elements for retaining the heating band.

The heating band 44 of the represented embodiment example is retained on the inflow side and on the outflow side by a support structure 47, 47.1 (see FIG. 9). In the representation of FIG. 9, only the support structure 47 can be seen, since the support structure at 47.1 has been omitted to allow inspection. A portion of the casing 48 can also be seen.

The heating band 44 is retained on the support structures 47, 47.1 with intercalation of bearing elements 49, as described for the embodiment example of the preceding figures. The bearing elements 49 are preferably connected to a support structure 47 or 47.1 by structured activated solder for providing a compensation element, in particular as represented for the embodiment example described above.

According to another embodiment example, it is provided that the bearing elements are connected to the support frame by an unstructured activated solder strip or by activated solder paste.

The arrangement of the bearing elements 49 is selected so that several bearing elements 49 are arranged at the peak of a bend and others are arranged on the heating band section located between two bends and namely before the transition into the facing bend. The width of the slot-shaped bearing recess of the heating elements 49 is dimensioned so that, even in the case of an arrangement of same in a bend, the heating band is retained therein in a manner of a floating bearing. By this arrangement of the bearing elements, each meander section 45, 45.1, 45.2, 45.3 of the heating band 44 is secured in two directions.

Figure 10:
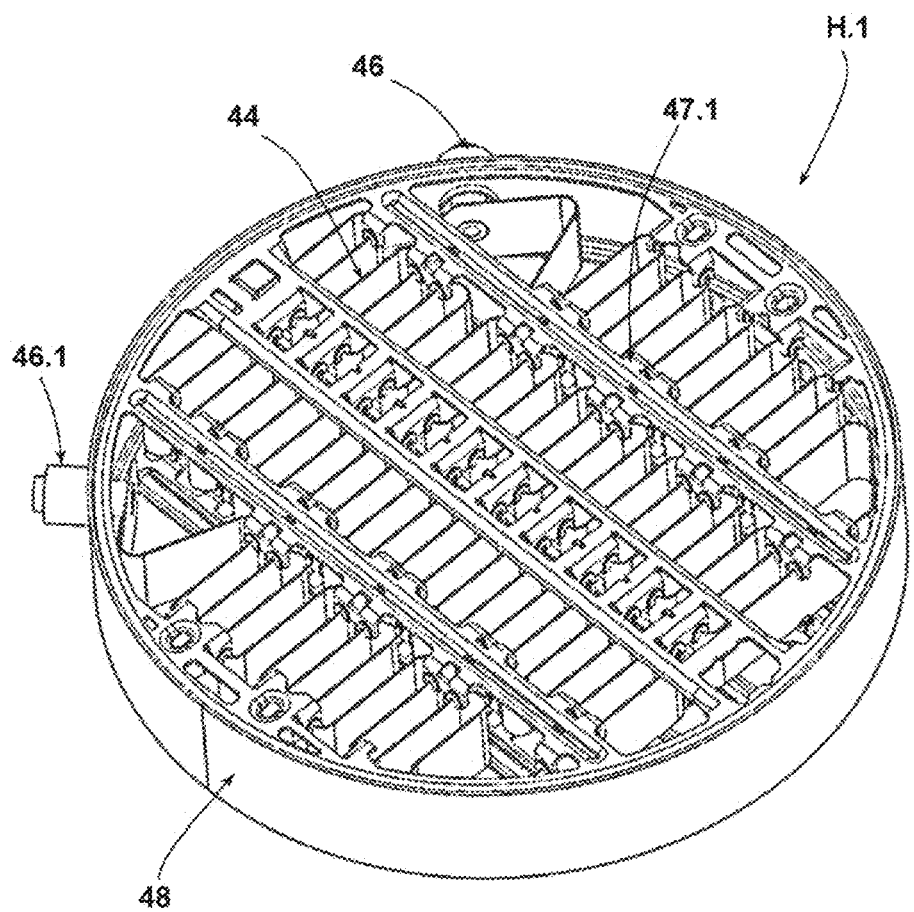
FIG. 10: shows the inflow-side support structure of the electrical heating unit according to a first embodiment of the support structure.

FIG. 10 shows the electrical heating unit H.1 with the heating band 44 and the support structure 47.1 not represented in FIG. 9.

Figure 11:
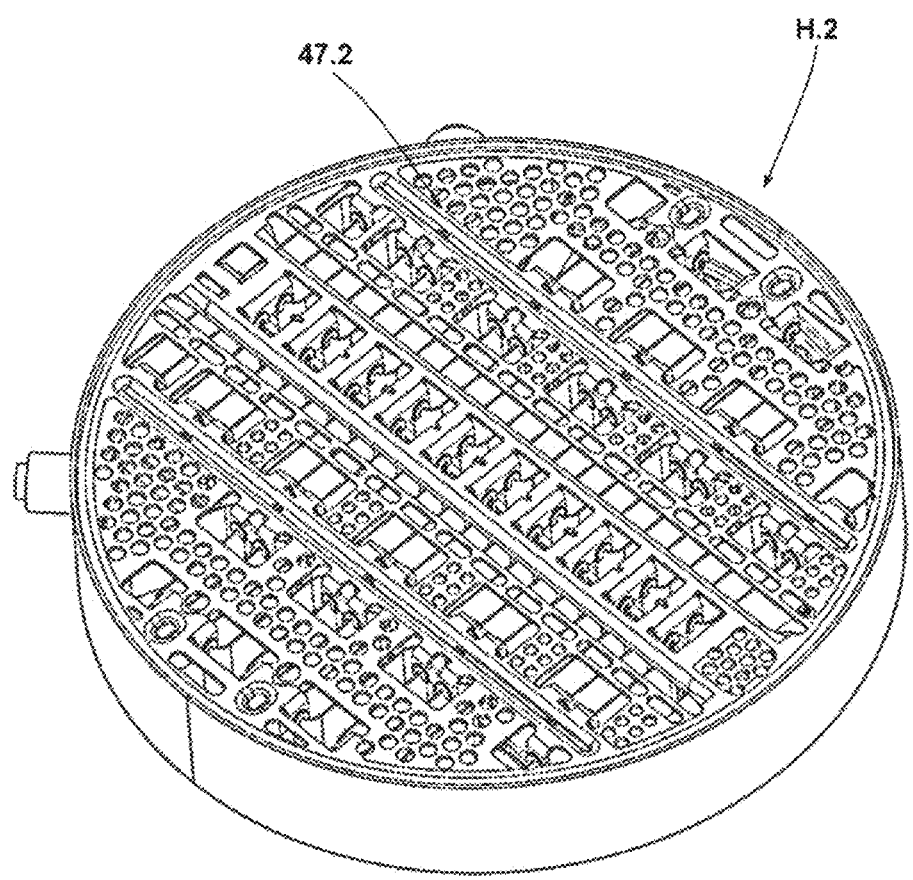
FIG. 11 shows the inflow-side support structure of the electrical heating unit according to an additional embodiment of the support structure.

FIG. 11 shows an additional electrical heating unit H.2 with a view onto its inflow-side support structure 47.2. The heating unit H.2 differs from the heating unit H.1 only by the design of the support structure 47.2. For the rest, the above explanations concerning the electrical heating unit H.1 apply equally to the heating unit H.2. This support structure 47.2 is used at the same time as uniform distribution element. For this purpose, the support structure is designed in the manner of an impact plate into which, depending on the desired uniform distribution of flow and heat, perforations are introduced. They are hole patterns and elongate holes as well as continuously open slots.

The description makes it clear that with the described exhaust gas purification system 1, an efficient, synergistic collaboration of the individual actuators, including the diesel engine, with regard to temperature management of the catalytic converters 4, 6, is provided in order to reduce emissions, in particular NOx emissions precisely in temperature-critical operating states of the internal combustion engine.

The invention has been described using embodiment examples. Without going beyond the scope of the valid claims, numerous additional possibilities arise for a person skilled in the art for implementing the invention without this having to be explained in greater detail in the context of these embodiments.

| List of Reference Numerals | |
|---|---|
| 1 | Exhaust gas purification system |
| 2 | Diesel engine |
| 3 | Exhaust gas system |
| 4 | Oxidation catalytic converter |
| 5 | Particle filter |
| 6 | SCR catalytic converter |
| 7 | Reducing agent supply |
| 8 | Injector |
| 9, 9.1 | Temperature sensor |
| 10 | Control device |
| 11 | Interface |
| 12 | Characteristic field storage |
| 13 | Casing |
| 14 | Heating band |
| 15, 15.1 | Heating band section |
| 16 | Heating band bend |
| 17, 17.1 | Electrical connection bolt |
| 18, 18.1 | Electrical conductor |
| 19, 19.1 | Support structure |
| 20-23 | Strut |
| 24 | Cross-connector |
| 25 | Connection extension |
| 26 | Bearing element |
| 27 | Heating band bearing |
| 28 | Groove |
| 29 | Bearing element recess |
| 30 | Base |
| 31 | End face |
| 32 | Compensation element |
| 33 | First section |
| 34 | Second section |
| 35 | Web |
| 36 | Bearing element |
| 37 | Strut |
| 38 | Bearing element recess |
| 39 | Strike plate |
| 40 | Strike plate |
| 41 | Recess |
| 42 | Connection web |
| 43, 43.1 | Casing |
| 44 | Heating band |
| 45, 45.1-45.3 | Meander section |
| 46, 46.1 | Connection bolt |
| 47, 47.1, 47.2 | Support structure |
| 48 | Casing |
| 49 | Bearing element |
| H, H.1, H.2 | Electrical heating unit |

The invention claimed is:

1. An electrical heating unit for introduction into the exhaust gas system of a combustion engine, said heating until being located up stream with respect to an exhaust gas purification unit, said heating unit comprising:
a casing and at least one resistance heating element band, said heating band retained inside the casing;
the at least one heating band having a meandering pattern and a flat face thereof extending parallel or substantially parallel to a longitudinal axis of the casing;
the heating unit further comprising at least one support structure located on an end face relative to the heating band;
the at least one support structure being mechanically connected to the casing and having slot-shaped heating band bearings retaining the heating band inside the casing;
an edge portion of the heating band engaging in the slot-shaped heating band bearings; and
the heating band being electrically insulated from the casing by the support structure.

2. The electrical heating unit of claim 1, wherein the support comprises a frame with multiple struts extending transversely to a longitudinal course of the heating band sections and further comprising a slot-shaped heating band bearings on a side facing the heating band.

3. The electrical heating unit of claim 2 wherein adjacent struts are connected to one another by cross-connectors.

4. The electrical heating unit of claim 3, wherein the frame-like support structure is made of metal; and
bearing elements formed of an electrically nonconductive material are connected with a respective slot-shaped heating band bearing on the side facing the heating band.

5. The electrical heating unit of claim 4, wherein the struts of the support structure are metal strips facing the end face of the heating band on a small side of the struts and have recesses for insertion of a respective bearing element.

6. The electrical heating unit of claim 5, wherein an external side of the bearing elements further comprise a groove in which the edge of a recess of a strut engages.

7. The electrical heating unit of claim 4, wherein the bearing elements are connected by frictional connection on the support structure.

8. The electrical heating unit of claim 7, wherein the bearing elements have at least one compensation element inserted therein; and
wherein the at least one compensation element having bearing element recess for a bearing element in a of the support structure;
said compensation element comprising an activated solder strip structured by an alternation of first and second sections, of which the first and second sections are arranged offset in the direction of the compensation effect between the bearing element;
and the bearing element recess and are soldered to the bearing element and the bearing element recess of the support structure or in that the bearing element recesses are undercut in the direction of the free front surface of the support structure; and
the support structure comprises holding elements for inserting a bearing element into a bearing element recess and is retained therein by positive-locking connection in transverse direction with respect to the plane of the bearing element recess.

9. The heating unit according to claim 8, wherein an activated solder strip as compensation element is formed of members connecting two mutually offset sections and the members are inclined with respect to the planes of the mutually facing joining partners.

10. The electrical heating unit of claim 1, wherein the heating band bearings are floating bearings such that the engaging heating band section is retained in a shiftable manner in the direction of the heating band's longitudinal extent.

11. The electrical heating unit of claim 1 further comprising the support structure located adjacent to a bending region of the heating band, wherein the bending region two adjacent heating band sections are connected by a heating band bend:
the support structure comprising a respective strut and, between said edge struts at least one additional strut; and wherein the heating band bearings of the edge struts are fixed bearings and the heating band bearings of the at least one strut located between these edge struts are floating bearings.

12. The electrical heating unit of claim 1, wherein the heating band is retained on its two end faces by a respective support structure.

13. The electrical heating unit of claim 1, wherein the casing for electrical connecting of a heating band further comprises two respective electrical connection bolts passing through the casing which electrical connection bolts contact the respective last heating band section on a radially outward facing flat side thereof.

14. The electrical heating unit of claim 1 wherein said electrical heating unit has a single electrical resistance heating element.

15. The electrical heating unit according to of claim 1 wherein the at least one support structure is arranged on an inflow side with respect to the heating band and is an impact plate having throughflow openings, wherein the throughflow openings are designed and arranged to achieve a uniform flow distribution in the exhaust gas flow flowing into the heating band.

16. An exhaust gas purification unit for introduction into the exhaust gas system of an internal combustion engine which for operation requires a temperature higher than the ambient temperature, wherein the electrical heating unit of claim 1 is intercalated in the exhaust gas system arranged immediately upstream of the exhaust gas purification unit.

17. An exhaust gas purification system for reducing the emissions of an internal combustion engine with at least one exhaust gas purification unit of claim 16.

18. The exhaust gas purification system of claim 16, wherein the exhaust gas purification system has multiple exhaust gas purification units.

\* \* \* \* \*